(12) United States Patent
Escapa et al.

(10) Patent No.: US 10,955,163 B2
(45) Date of Patent: Mar. 23, 2021

(54) AUTOMATED BUILDING CONCIERGE

(71) Applicant: MICROSOFT TECHNOLOGY LICENSING, LLC, Redmond, WA (US)

(72) Inventors: Daniel Escapa, Seattle, WA (US); Hubert Van Hoof, Redmond, WA (US); Matthew Evan Vogel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 16/107,779

(22) Filed: Aug. 21, 2018

(65) Prior Publication Data

US 2020/0064007 A1 Feb. 27, 2020

(51) Int. Cl.
  F24F 11/58 (2018.01)
  F24F 11/65 (2018.01)
  H04L 12/28 (2006.01)

(52) U.S. Cl.
  CPC .............. *F24F 11/58* (2018.01); *F24F 11/65* (2018.01); *H04L 12/2816* (2013.01)

(58) Field of Classification Search
  None
  See application file for complete search history.

(56) References Cited

U.S. PATENT DOCUMENTS

| 7,243,024 B2 | 7/2007 | Endicott |
| 7,496,445 B2 | 2/2009 | Mohsini et al. |
| 8,374,780 B2 * | 2/2013 | Mays .................... G01C 21/206 701/433 |
| 2010/0280968 A1 * | 11/2010 | Rashid ................... G01C 21/20 705/323 |
| 2011/0153201 A1 * | 6/2011 | Park ....................... G01C 21/20 701/533 |
| 2012/0166642 A1 * | 6/2012 | Saint Clair ........... H04L 67/125 709/225 |
| 2015/0116811 A1 * | 4/2015 | Shrivastava ........... G08C 17/02 359/275 |
| 2017/0238176 A1 * | 8/2017 | Garcia Morchon ......... H05B 37/0272 726/7 |
| 2018/0257658 A1 * | 9/2018 | Cho ....................... B60W 40/08 |
| 2019/0238358 A1 * | 8/2019 | Hurewitz ................ H04W 4/70 |

OTHER PUBLICATIONS

"Wayfinder", Retrieved from: https://web.archive.org/web/20171003231230/http:/www.acquiredigital.com/wayfinder/, Oct. 3, 2017, 6 Pages.

"Your AI Personal Assistant", Retrieved from: https://web.archive.org/web/20180331170751/https:/www.adenin.com/now-assistant, Mar. 31, 2018, 6 Pages.

(Continued)

*Primary Examiner* — Mohammad Ali
*Assistant Examiner* — David Earl Ogg
(74) *Attorney, Agent, or Firm* — Holzer Patel Drennan (57) ABSTRACT

Controlling environmental conditions. A method includes using one or more sensors in a location, identifying an entity in the location. The method further includes identifying one or more roles for the entity. The method further includes based on the one or more roles for the entity, modifying environmental conditions in the location, by modifying one or more devices associated with the location.

21 Claims, 6 Drawing Sheets

(56) References Cited

OTHER PUBLICATIONS

Donohue, et al., "Creating Business Value through Context-Aware Computing", In IT@Intel White Paper, Jul. 2013, 10 Pages.

Miu, Allen Ka Lun, "Design and implementation of an indoor mobile navigation system", In Thesis of Massachusetts Institute of Technology, Jan. 18, 2002, 60 Pages.

Neelakandan, et al., "Implementing Campus Indoor Location Tracking System", In International Journal of Engineering and Computer Science, vol. 5, Issue 5, May 2016, pp. 16731-16735.

* cited by examiner

AUTOMATED BUILDING CONCIERGE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, wireless mesh networks, cellular connections, or even computer to computer connections through serial, parallel, USB, or other connections via a wide variety of protocols (such as, but not limited to, MQTT, AMQP, http, Bluetooth, OPC-UA, SCADA, CoAP, BACnet, Modbus, KNX, LonTalk, Zigbee, Zwave, Sigfox, LoRa, etc.), some of which are industry or domain specific. The connections allow a computing system to access services at other computing systems and to quickly and efficiently receive data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Interconnection of various computing systems and devices has resulted in the ability to sense conditions in a building or other space and to control equipment in the building or other space. This is often generally referred to as building management.

Building management can be a complex and expensive process, with potential for error. For example, security of a building requires many man hours to staff the building. Intentional and unintentional human action can result in security breaches. In another aspect, human necessitated control of lighting, heating and cooling, workspace ergonomics, etc., can unnecessarily take away from more valuable activities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for controlling environmental conditions. A method includes using one or more sensors in a location, identifying an entity in the location. The method further includes identifying one or more roles for the entity. The method further includes based on the one or more roles for the entity, modifying environmental conditions in the location, by modifying one or more devices associated with the location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to improved building (or other location) control. This can be accomplished by identifying an entity in location. The entity is authenticated, and roles are identified for the entity. Based on the entity's roles, certain permissions are identified. As a result, environmental conditions in the location are changed. Note that when used herein, it should be appreciated that 'building' is simply one example, and other embodiments may use other locations or types of locations.

For example, consider the following scenario. A visitor enters a building of an enterprise. The visitor is identified by a building management system. This may be by automatic facial recognition, fingerprint recognition, voice recognition, other biometric measure, beacon signals from devices held by the visitor (such as cell phones, smart cards, etc.), passwords, etc. In this example, the visitor is not an employee of the enterprise, but had a meeting with an employee of the enterprise. Based on a calendar entry for the employee, the building management system is already aware of the time of the meeting and the visitor's desired attendance at the meeting. As a result of identifying the visitor, and identifying the meeting in the calendar, the building management system can assign a role of 'authorized visitor' to the visitor. The visitor would then have permission to enter the building, around the time of the meeting. In this case, a few minutes before the meeting, the building management system could change environmental conditions by unlocking doors to allow the visitor to enter the building. Once inside the building, the building management system could change the environmental conditions again by changing electronic signage to guide the visitor to the appropriate conference room. As this particular visitor is known to the building management system, at the conference room, the building management system can change the environmental conditions, yet again, to accommodate the visitor. In particular, the building management system may adjust temperature and lighting to a level preferred by the visitor. In some embodiments, the building management system can automatically adjust ergonomics of the conference room. For example, the building management system could cause a desk and/or chair to be adjusted to a particular height chair softness/hardness, sitting angle, etc. Once in the conference room, the visitor may choose to direct the building management system to adjust the temperature or lighting. However, because the visitor has a limited set of permissions, the visitor may be limited in how much adjustment they can request. For example, the visitor may be able to adjust temperature between 68 and 72 degrees F., where an entity authenticated in an employee of the enterprise role may have broader permissions and may be able to adjust the temperature between 65 and 75 degrees F.

A description of a computing system where embodiments may be implemented, followed by a description of how hierarchical graphing of an entity may be accomplished will now be presented.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
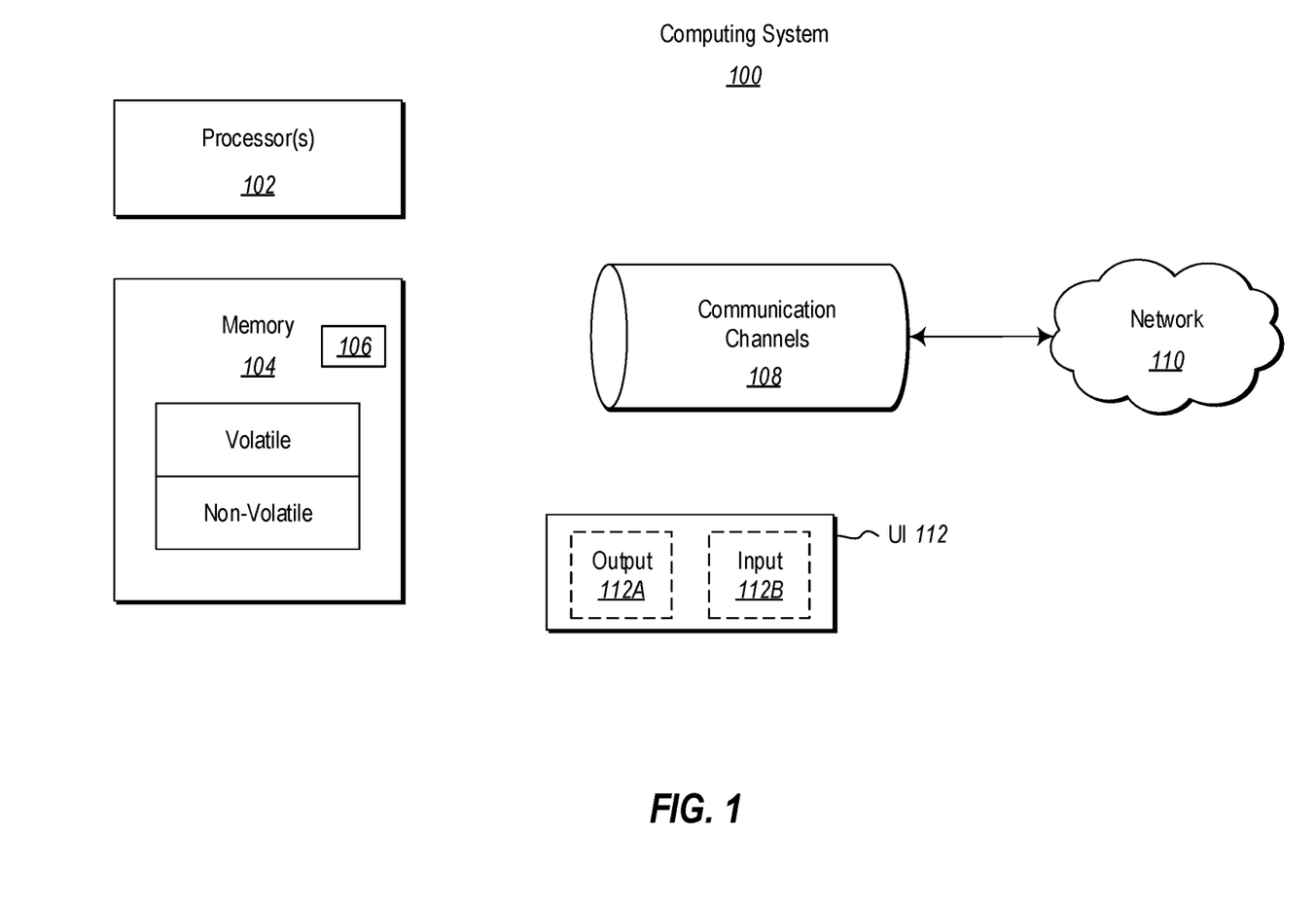
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes NAND flash memory or other flash memory, RAM, DRAM, SRAM, ROM, EEPROM, CD-ROM or other optical disk storage, solid-state disk storage, magnetic disk storage or other storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, traditional computing systems such as smartphones, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, etc.) and the like. In modern computing systems, in the age of Internet of Things (IoT), computing system configurations may be virtually any type of device including (but most certainly not limited to) smart luggage, smart jewelry, smart drinking bottles, smart skate boards, smart golf clubs, smart toys, smart brewing machines, smart wallets, smart home and business automation gear, smart appliances, smart furniture, etc. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Reference is made frequently herein to IoT devices. As used herein, an IoT device can include any device that is connected to a network (whether that be a personal area network, local area network, wide area network, and/or the Internet) and that interacts with a physical environment (whether that be to control or influence some aspect of a physical environment, and/or to receive sensor data from a physical environment). As such, references to IoT devices herein should be interpreted broadly to include vast categories of devices, regardless of how those devices may be named or marketed. From a computing perspective, IoT devices may range from fairly complex (e.g., such as being embodied on a general-purpose computer system), to fairly simple (e.g., such as being embodied within a special-purpose microcontroller environment).

Figure 2:
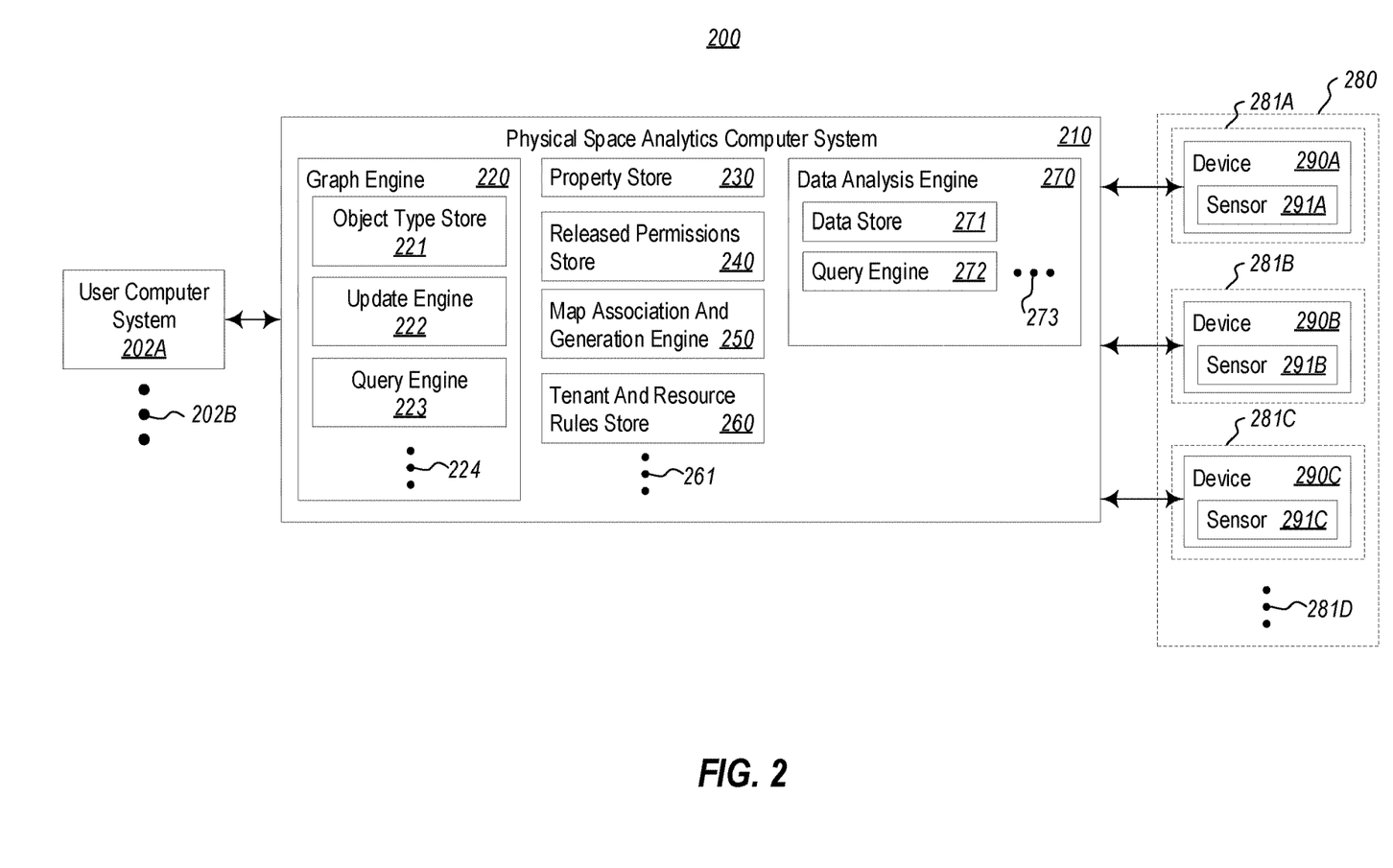
FIG. 2 illustrates an example environment for providing access to sensor data from devices within a physical space.

FIG. 2 illustrates an example environment 200 for providing access to sensor data from devices within a physical space. As illustrated, the environment 200 includes a user computer system 202A. The user computer system 202A may be embodied, for example, by computer system 100, as described with respect to FIG. 1. The user computer system 202A may comprise any type of computer system that is configured to communicate with, and utilize the functionality of, a server computer system 210, which is described later. In an example, the user computer system 202A may comprise a desktop computer, a laptop computer, a tablet, a smartphone, and so forth. Notably, while the environment 200 includes a single user computer system 202A, the ellipses 202B represents that any number of user computer systems may communicate with, and utilize the functionality of, the server computer system 210.

The server computer system 210 is configured to provide access to sensor data from devices (such as IoT devices) located within physical spaces (e.g., a room within a building), as further described herein. Again, the server computer system 210 may be embodied, for example, by computer system 100, as described with respect to FIG. 1. The server computer system 210 may comprise any type of computer system, including any combination of hardware and/or software that is configured to provide access to sensor data from devices located within particular physical spaces.

As shown, the server computer system 210 may include various engines, functional blocks, and components, including (as examples) a graph engine 220, a property store 230, a rules and permissions store 240, an association and generation engine 250, a tenant and resource rules store 260, and a data analysis engine 270, each of which may also include additional engines, functional blocks, and components (e.g., an object type store 221 within the graph engine 220). The various engines, components, and/or functional blocks of the server computer system 210 may be implemented on a single computer system or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the server computer system 210 may be implemented as software, hardware, or a combination of software and hardware.

Notably, the configuration of the server computer system 210 illustrated in FIG. 2 is shown only for exemplary purposes. As such, the server computer system 210 may include more or less than the engines, functional blocks, and/or components illustrated in FIG. 2. In particular, the ellipses 261 represent that any number of engines, functional blocks, and/or components may be utilized within the server computer system. Although not illustrated, the various engines of the server computer system 210 may access and/or utilize a processor and memory, such as the processor 102 and the memory 104 of FIG. 1, as needed, to perform their various functions.

Figure 3:
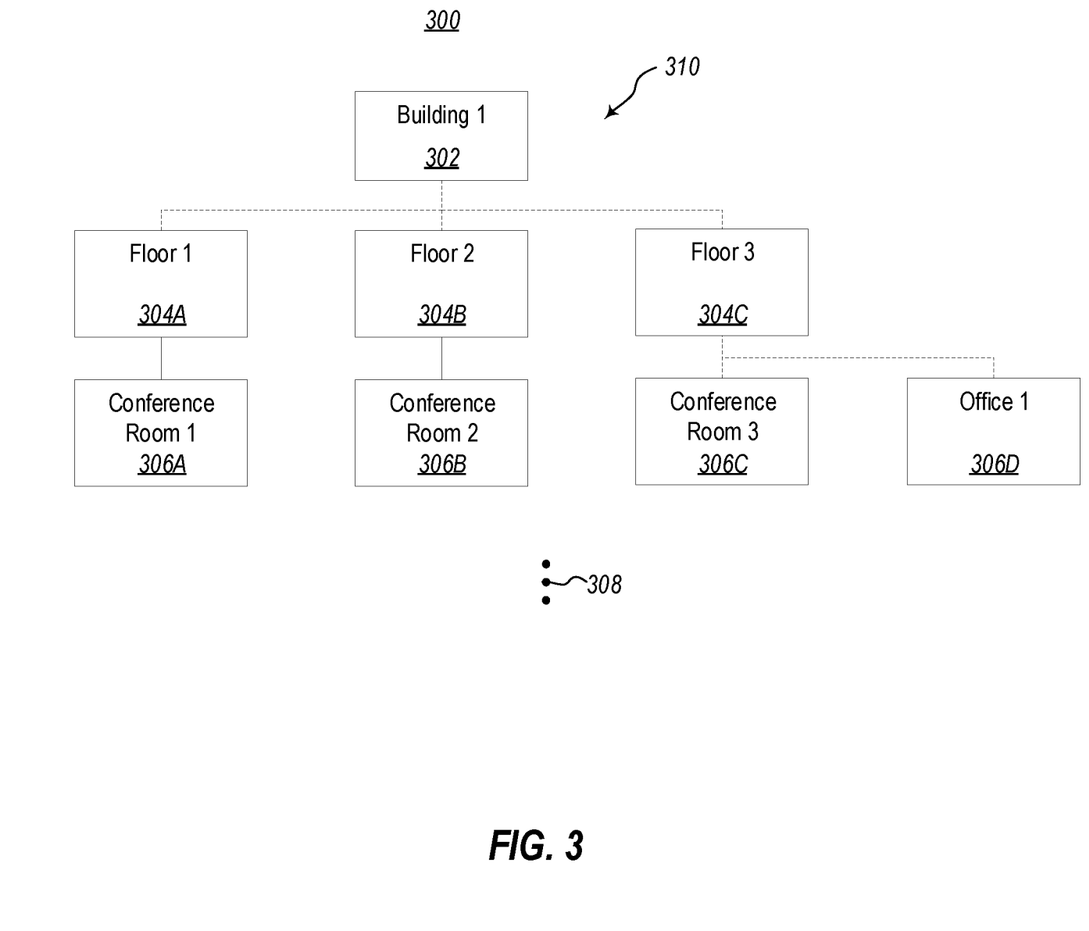
FIG. 3 illustrates an example hierarchical graph associated with a physical space.

As briefly introduced, the server computer system 210 includes the graph engine 220, the property store 230, the rules and permissions store 240, the association and generation engine 250, the tenant and resource rules store 260, and the data analysis engine 270. The graph engine 220 may be configured to generate, store, and/or manage one or more hierarchical graphs (e.g., hierarchical graph 310 of FIG. 3) that defines a topology of areas and sub-areas of a physical space. For instance, FIG. 3 illustrates a hierarchical graph 310 that includes a topology of nodes associated with a physical space comprising "building 1" (e.g., building node 302). The hierarchical graph 310 also represents areas and sub-areas of "building 1," such as different floors (i.e., floor node 304A, floor node 304B, and floor node 304C, all of which are sub-nodes of building node 302), as well as different rooms (i.e., conference room node 306A, conference room node 306B, conference room node 306C, and office node 306D) associated with each floor. Although not shown, each of the room nodes 306A-306D could be associated with additional sub-nodes representing objects in, or associated with, the rooms, such as desks, chairs, tales, computer, lab equipment, services to control the room, services to reserve the room, etc.

Figure 4:
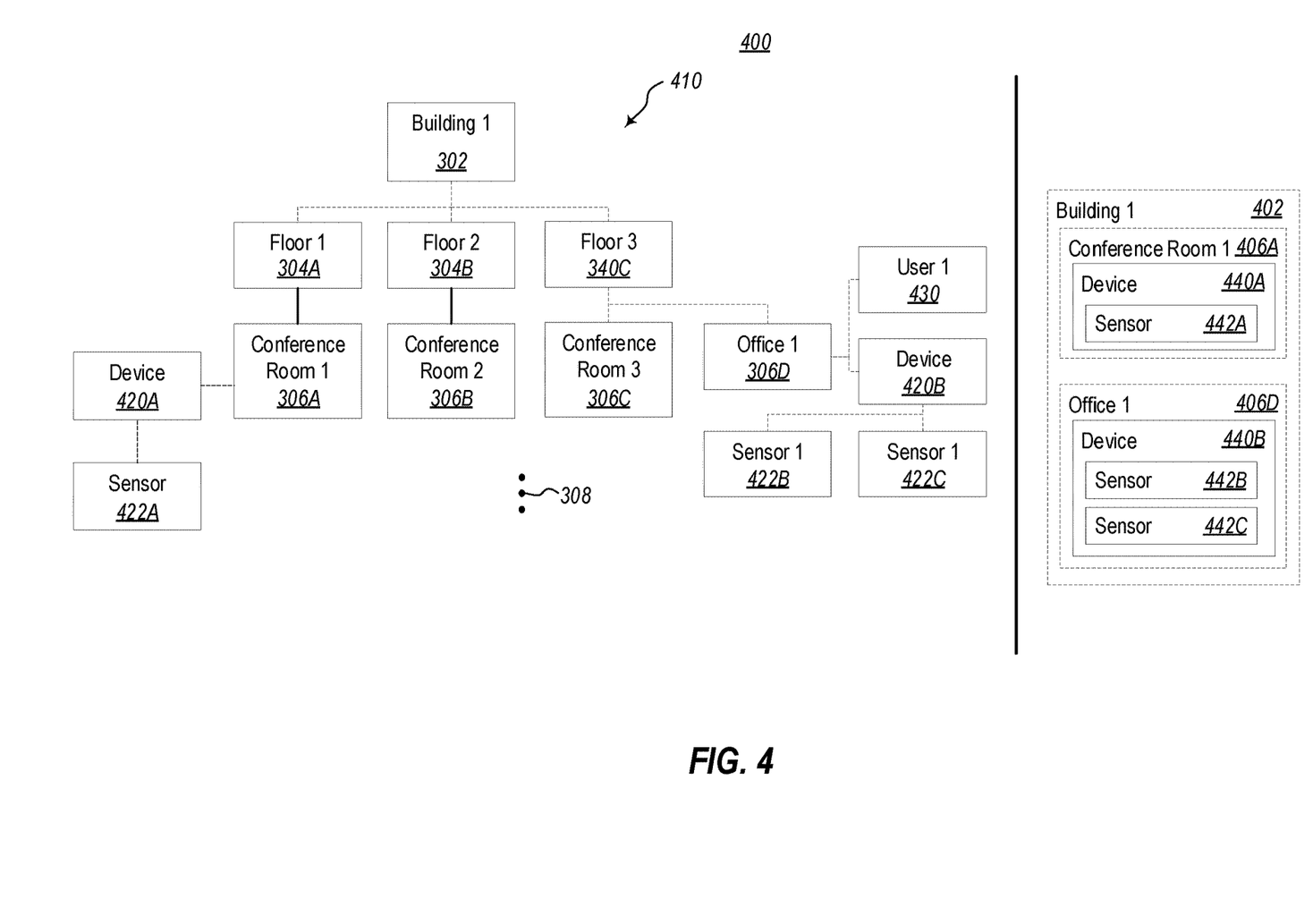
FIG. 4 illustrates an example hierarchical graph associated with a physical space and devices associated with areas or sub-areas of the physical space.

Any node in the hierarchical graph 310 could be associated with devices/sensors. For example, the various room nodes (i.e., the conference room node 306A and the office node 306D) may also be associated with devices and sensors. Similarly, FIG. 4 shows a related graph 410, that includes device nodes 420A and 420B and sensor nodes 422A-422C. While only seven nodes associated with areas/sub-areas are illustrated in FIG. 3, the ellipses 308 represents that any number of nodes that are associated with areas/sub-areas and devices/sensors may be utilized when practicing the principles described herein (whether those nodes be added or deleted in a horizontal direction (breadth) or a vertical direction (depth)). Furthermore, the topology of the graph may be continuously modified via adding or deleting nodes of the graph (in a horizontal direction or vertical direction). For instance, using the example of FIG. 3, a number of additional building nodes associated with different buildings than building 1 (corresponding to building node 302), each of which additional buildings may include additional nodes corresponding to floors, rooms, and so forth, may also be included within the graph 310.

In some embodiments, the hierarchical graph 310 may be stored within a relational database, though any type of database could be used. Additionally, regardless of the type of graph used, the full paths in the graph for each given node may be stored as metadata in the node to increase the performance and efficiency of querying the hierarchical graph 310. In this way, identification (e.g., via a query) of any ancestral node or child node (i.e., children nodes, grandchildren nodes, great-grandchildren nodes, and so on) of a given node may be performed in an order of one operation (i.e., an O(1) operation). For instance, a query that requests each node having a path that starts with "building1/floor3" (i.e., corresponding to the floor node 304C) may identify conference room 3 and office 1 (i.e., corresponding to conference room node 306C and office node 306D, respectively) as being children of the floor node 304C in an O(1) operation.

Notably, even if the conference room node 306C and the office node 306D were grandchildren, great-grandchildren, and so on, of the floor node 304C, a request for identification of each node having a path that starts with "building1/floor3" could result in identification of the conference room node 306C and the office node 306D (as well as any nodes between the floor node 304C and the conference room node 306C/the office node 306D) in an O(1) operation. Accordingly, paths associated with each node may be automatically computed and saved, which effectively tracks a primary identification for each node of the graph. While a cost is incurred upfront to generate and store each path (e.g., in connection with the addition and/or removal of one or more nodes to within the graph), the graph may be quickly and efficiently traversed to identify nodes and relationships between nodes within the graph than traditional traversing of graphs. By storing primarily static information in the graph, however, the need to generate/store these paths can be relatively infrequent.

Returning to FIG. 2, as illustrated, the graph engine 220 includes various components that may comprise any combination of appropriate hardware and/or software, including an object type store 221, an update engine 222, and a query engine 223. Notably, the ellipses 224 represents that any number of components may be included with the graph engine 220 (i.e., more or less than the components illustrated within the graph engine 220).

The object type store 221 comprises a data store of node object types that can be selected to create additional nodes within the graph 310. For instance, in addition to the node object types of buildings, floors, and rooms that are explicitly shown in FIG. 3, any number of object types associated with areas/sub-areas of physical spaces (as well as devices/sensors and individuals, as further described herein) may be used within the graph 310, including but not limited to organizations (e.g., businesses), geographic regions (e.g., continents, countries, states, cities, counties, and so forth), types of areas (e.g., buildings, farms, houses, apartments, conference rooms, offices, bathrooms, breakrooms, study areas, desks, chairs, and so forth), types of devices (e.g., thermostat, projector, paper towel dispenser, television, computer, and so forth), types of sensors (e.g., thermocouple, thermistor, humidity sensor, $CO_2$ sensor, Geiger counter), and so forth. Additionally, the object type store 221 may be extensible, such that additional object types may be created on demand.

The update engine 222 may be configured to update the hierarchical graph 310 with any changes made to the graph. For instance, the update engine 222 may update the graph with additional nodes, update the graph with less nodes (e.g., deleted nodes), update nodes with new or modified properties, update nodes with new or modified paths, and perform any other operations associated with modifying or updating the graph.

The query engine 223 may be configured to allow for performing queries to the hierarchical graph 310. In particular, the query engine 223 may be configured to receive queries, generate query plans, build responses to queries, and/or perform any other operations associated with receiving and responding to queries of the hierarchical graph 310.

As briefly introduced, the server computer system 210 further includes data analysis engine 270. The data analysis engine 270 may be configured to receive, gather, manage, and process data received from devices/sensors located within a physical space (associated with the hierarchical graph that defines the topology of the physical space). For instance, FIG. 2 illustrates various devices and sensors located within a physical space 280. In particular, the physical space 280 comprises various areas and sub-areas, including area/sub-area 281A, area/sub-area 281B, and area/sub-area 281C. Each of the sub-areas includes a single device having a single sensor (i.e., area/sub-area 281A includes device 290A having sensor 291A, area/sub-area 281B includes device 290B having sensor 291B, and area/sub-area 281C includes device 290C having sensor 291C). Notably, while each of the areas/sub-areas within the physical space 280 includes a single device having a single sensor, the ellipses 290 represents that there may be any number of areas/sub-areas within the physical space 280, each of the areas/sub-areas including any number of devices having any number of sensors (including zero devices/sensors).

Notably, the devices and sensors may include any type of devices/sensors, including but not limited to devices/sensors associated with detecting temperature, $CO_2$, light, pressure, toxic chemicals, humidity, biometric data (such as facial recognition, fingerprint recognition, etc.), and so forth. As such, the combination of the devices 290 (i.e., the device 290A through the device 290C) and the sensors 291 (i.e., the sensor 291A through the sensor 291C) may be configured to capture sensor data (e.g., changes in temperature) and send the captured data to the data analysis engine 270. Furthermore, "sensors" can be partially or entirely virtual. A sensor, as used herein, does not have to be a physical device, but rather a "sensor" output could be a value provided by another cloud service or API. For example, a "sensor" could output the current weather forecast for a building's location from NOAA. In an alternative or additional example, sensor output could be calendar information produced by a scheduling calendar. In an alternative or additional example, sensor output could be authentication information as a result of sensing a user's authentication actions.

The data analysis engine 270 may then be configured to receive, gather, manage, and process data received from such devices/sensors. In particular, as illustrated, the data analysis may include a data store 271 that is configured to organize, store, and allow access to received sensor data. The data store 271 may comprise any type of data store that is configured to manage dynamic, frequently changing data such as sensor data, and that provides quick and efficient performance. In an example, the data store 271 may comprise a key-value database. For instance, the data store 271 may comprise a REDIS' CACHE. Data associated with a particular device (e.g., sensor data) may also be linked with device nodes of the hierarchical graph (e.g., the hierarchical graph 410), such that upon identification of a device node within the hierarchical graph, sensor data associated with the device corresponding to the device node may also be accessed, as further described herein.

As shown, the data analysis engine 270 further includes a query engine 272. The query engine 272 may be configured to allow for performing queries to the data store 271. In particular, the query engine 272 may be configured to receive queries, generate query plans, build responses to queries, and/or perform any other operations associated with receiving and responding to queries of the data store 271.

FIG. 4 illustrates an environment 400 including hierarchical graph 410 comprising area/sub-area nodes, as well as device/sensor nodes that are each associated with one or more area/sub-area nodes. As shown, the conference room node 306A is associated with device node 420A (having a corresponding sensor node 422A) and the office node 306D is associated with the device node 420B (having two corresponding sensor nodes, the sensor node 422B and the sensor node 422C). Additionally, FIG. 4 includes a representation of an actual physical space 402 (associated with building 1) that corresponds to the building node 302.

As illustrated, the physical space 402 also comprises conference room 406A (associated with conference room 1 and corresponding to the conference room node 306A) that includes the actual physical device 440A having the sensor 442A, as well as office 406D (associated with office 1 and corresponding to the office node 306D) that includes the actual physical device 440B having both the sensor 442B and the sensor 442C. In a specific example, the device 440A may correspond to a thermostat that includes a thermocouple (i.e., the sensor 442A) for measuring temperature. Such temperature measurements may then be sent to the data analysis engine for managing, storing, and processing the received sensor data.

Additionally, as illustrated in FIG. 4, user nodes (e.g., user node 430) may be included within the hierarchical graph 410 as being associated with one or more area/sub-area nodes. In particular, FIG. 4 shows the user node 430 being associated with the office node 306D. In a specific example, the user 1 (i.e., corresponding to the user node 330) may comprise an individual that has been assigned to office 1 (i.e., corresponding to the office node 306D).

Notably, regardless of object/node type (e.g., area/sub-area nodes, device nodes, sensor nodes, user nodes), data and/or metadata associated with the node may be stored in the hierarchical graph (e.g., the hierarchical graph 310 or the hierarchical graph 410), the data store 271 of the data analysis engine 270, or any other appropriate location associated with the server computer system 210.

As briefly introduced, the server computer system 210 further includes property store 230, rules and permissions store 240, association and generation engine 250, and tenant and resource store 260. The property store 230 may comprise a data store that includes properties associated with nodes of the hierarchical graph 310. For instance, particular properties may automatically be associated with particular object types (i.e., node types), as well as children of such object types. In a more particular example, a property associated with occupancy of a chair within a room may propagate to the room itself (i.e., showing that the room is occupied). Furthermore, as discussed with respect to the object type store 231, the property store may also be extensible, such that properties may be created and associated with any given node, and potentially associated with ancestral or children nodes of the given node.

The rules and permissions store 240 may include various rules and permissions associated with particular roles assigned to users. For instance, based on a particular role (e.g., an administrator) assigned to a user, the user may have access to perform various operations, including adding/deleting nodes, modifying nodes, accessing/modifying functionality of various devices (e.g., locking doors), and so forth.

The association and generation engine 250 may be configured to perform numerous functions with respect to associating maps with the hierarchical graph (and devices providing data to the data store), and/or generating the hierarchical graph, itself. For instance, the association and generation engine 250 may be able to generate the hierarchal graph 300 based on user input and/or based on a map. In another example, the association and generation engine 250 may be able to link nodes of the hierarchical graph to locations or devices included within a map. In yet another example, the association and generation engine 250 may further be able to generate a map based on information included within the hierarchical graph corresponding to nodes of the hierarchical graph.

The tenant and resource rules store 260 may include rules associated with how resources, permissions, properties, and so forth are to be handled for each given entity (e.g., tenant) that utilizes the hierarchical graph.

Notably, the ellipses 261 represent that the server computer system 210 may include any number of components (i.e., whether more or less) than the components illustrated within the server computer system in FIG. 2. For instance, while both the graph engine 220 and the data analysis engine 270 include corresponding query engines (i.e., the query engine 223 and the query engine 272, respectively), an overarching query engine may be included within the physical analytics computer system that allows for querying both the graph engine 220 and the data analysis engine 270. In this way, a user may be able to generate queries that can traverse the hierarchical graph (e.g., the hierarchical graph 410) to identify one or more devices associated with a particular area/sub-area of the hierarchical graph, as well as current (or previous) sensor data associated with the one or more devices via the data store 271 and the data analysis engine 270.

Some embodiments illustrated herein can implement a sort of 'personal assistant' at a location granularity. For example, using ambient intelligence, embodiments can implement personal or building (or other location) assistants where an automated assistant acts on behalf of the building. The automated assistant knows the identities of entities (which could be people, devices, animals, etc.) in the building, and knows the roles of those entities. Based on their roles, the entities have certain levels of permission. Based on those permissions, the environment of the location can be changed, either automatically or based on entity input.

Figure 5:
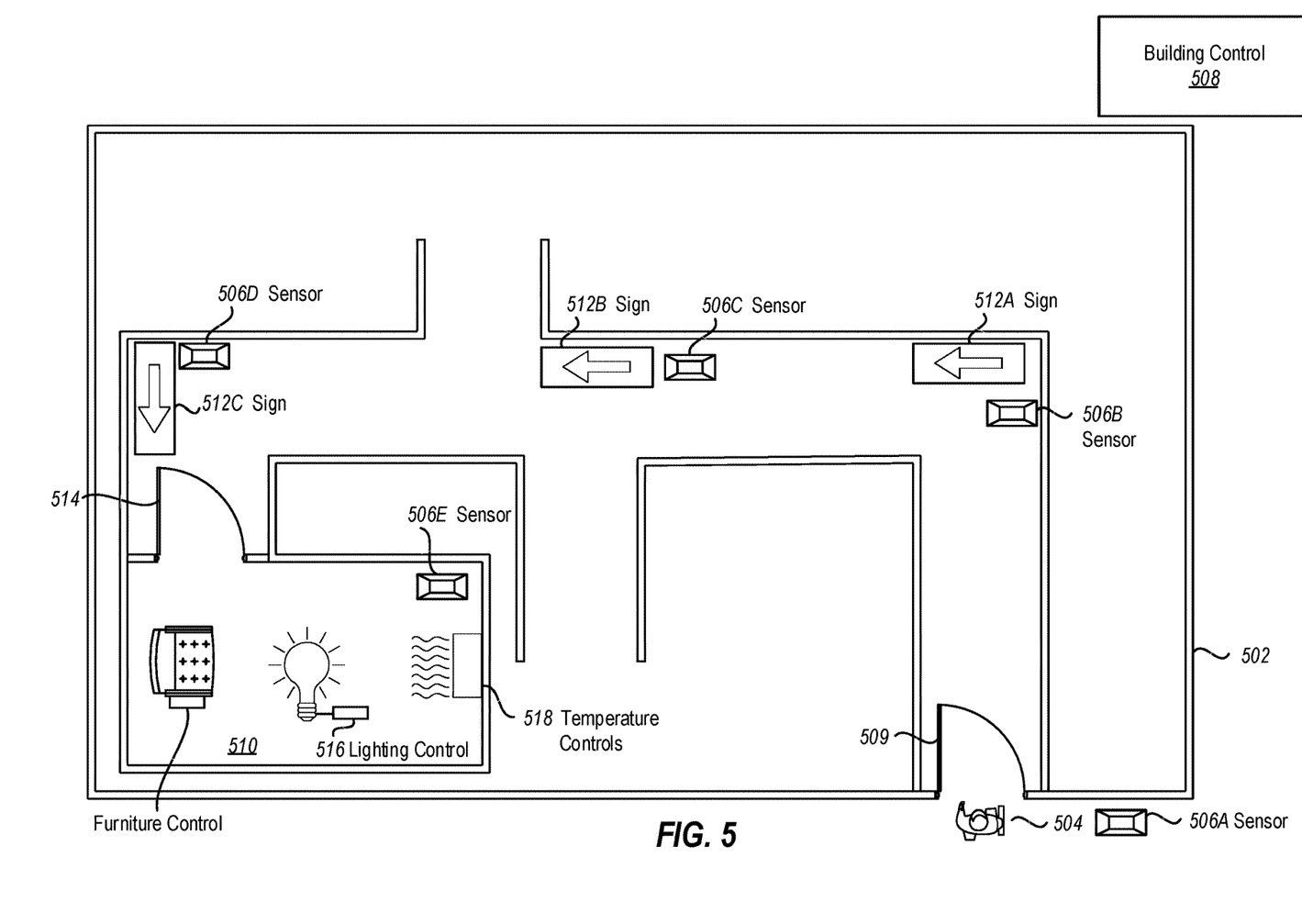
FIG. 5 illustrates a building location, and an example of an entity interacting with the building location.

Additional details will now be illustrated in the context of a functional example. Attention is directed to FIG. 5, which illustrates the functional example. FIG. 5 illustrates a building 502. An entity 504 approaches the building 502. In this example, the entity 504 is a visitor who has a meeting with another entity in the building 502. However, the entity 504 could be any one of a number of different roles. For example, the entity could be an employee, a manager, a maintenance worker, an enterprise owned device, or virtually any other entity.

A sensor 506A detects the presence of the entity 504. Additionally, the sensor 506A may be able to detect the identity of the entity 504. The sensor 506A indicates to a building control 508 the presence, and potentially identity, of the entity 504. In some embodiments, the sensor 506A may provide data to the building control 508, which can determine the identity of the entity 504. The building control 508 may be embodied using a physical space analytics computer system 210 as illustrated in FIG. 2.

The building control 508 has access to calendar scheduling to determine when the meeting with the entity 504 should occur. Additionally, the building control knows from the calendar entry the location of the meeting, the duration of the meeting, attendees of the meeting, etc. A few minutes before the meeting, the building control 508 can unlock a door 509. This allows the entity 504 to enter the building 502 to attend the meeting. Thus, in this case, building control 508 knows the identity of the entity 504, the time of the meeting, and thus knows the role of the entity. In this case, the role of the entity 504 is 'visitor meeting attendee in room 510 at a particular time.' Alternatively, the role may be 'visitor' and permissions may be conditional, such as limiting access only to room 510, and only around the time of the scheduled meeting.

Note that the entity 504 may have its identity classified in a number of different ways. For example, the building control 508 may know a particular identity for the entity 504. For example, the building control 508 may be able to use the sensor 506A to identify the identity of the entity 504 with particularity. For example, the sensor 506A may be a biometric sensor configured to detect biometric characteristics of the entity 504. For example, the sensor 506A may include a fingerprint reader, iris scanner, voice detection sensor, facial recognition sensor, or other biometric detection hardware. The building control 508 can use data from the sensor 506A to identify the identity of the entity 504 with particularity by comparing data received from the sensor 506A with various databases or other information. For example, the entity 504 may have a history of visiting an enterprise associated with the building 502 and building control 508. The building control 508 can reference this history information to particularly identify the identity of the entity 504. Alternatively or additionally, the enterprise associated with the building 502 and building control 508 may have various agreements with other enterprises having biometric data stores. For example, the entity 504 may have registered with a particular identity service and provided certain biometric data that is available to the building control 508 for identification of the identity of the entity 504.

In an alternative or additional example, the identity of the entity 504 may be identified based on some credential carried by the entity 504. This credential could be as simple as a password. Alternatively, or additionally, this credential could be some type of smart device carried by the entity 504. For example, the entity 504 could carry a smartcard. Alternatively, or additionally, the entity 504 may register with the enterprise prior to the meeting at the building 502. A code could be sent to a digital device carried by the user entity 504, such as the entity's cell phone or other digital device. The digital device could then be used to authenticate to the sensor 506A through means such as near field communication, barcode scanners, RFID scanners, etc.

In some embodiments, combinations of automated identity identification and user assisted identity identification may be used. For example, in some embodiments, the sensor 506A and the building control 508 may be used to attempt to identify the identity of an entity. The identity may be identified, but with low confidence. In some embodiments, if the confidence is below a predetermined threshold, the system may attempt to obtain additional information to increase the confidence. For example, the building control 508 may ask the entity to identify themselves through authenticated or non-authenticated means. For example, the building control 508 may have the ability to ask the entity 504 to authenticate themselves through an app on a device controlled by the entity 504. Alternatively, the business control 508 may be able to ask other entities to identify the entity 504. For example, when identification of the entity 504 confidence is low, the business control 508 may be able to transmit a picture taken from the sensor 506A to other meeting attendees to allow the other meeting attendees to confirm the identity of the entity 504.

In some embodiments, the identity of the entity 504 may be classified as unknown. In this case, a limited set of permissions may be applied to the entity 504. These permissions would restrict the entity's experience in the building 502 based on the role of the entity as an unknown entity in the associated permissions with unknown entities. Thus, for example, the entity 504 may be allowed to enter the building 502, but will be prevented from accessing, or in some cases even viewing, certain portions of the building 502.

When the building control 508 has determined that the entity 504 has sufficient permissions to enter the building 502, then the entity is allowed to enter the building 502 and proceed to the conference room 510. In this example, the entity proceeds down the hallway towards a sensor 506B. The sensor 506B is able to provide information for use in identifying the identity of the entity 504 to the building control 508. In this example, the building environment can be changed once again by changing a device, and in particular, the sign 512A to direct the entity 504 towards the room 510. For example, the sign 512A can display personalized greetings to the entity 504 along with directional indicators indicating to the entity 504 the direction that the entity 504 should proceed to reach the conference room 510. For example, the sensor 506B may include a camera or other sensor that is able to provide data to the building control to identify the identity of the entity 504 with some degree of confidence so as to be able to know the role of the entity 504, permissions associated with the role, and the appropriate changes to the environment of the building 502 based on that information.

In some embodiments, the sensor 506B may be able to detect that the entity 504 has strayed from the appropriate path to reach the conference room 510. That is, the sensor 506B may be able to tell that the entity is exceeding an environmental limit for the entity, and therefore modify the environmental conditions. Several different environmental changes may be made at this point. For example, in some embodiments, the building control 508 can cause the environment change by causing audio systems to issue audio alerts to the entity 504 that the entity has strayed from the appropriate path. Similar visual alerts may be presented to the entity 504. Alternatively, or additionally, alarms, including audio, visual, or other alerts, may be provided to building security or other appropriate entities to indicate that the entity 504 has strayed from the appropriate path to the conference room 510. In some embodiments, the building control 508 can cause certain denial of access actions to take place to prevent the entity 504 from accessing portions of the building 502 that should not be accessed by the entity 504. For example, the building control 508 may cause doors to be locked automatically if the entity 504 approaches those doors and does not have a role with sufficient permission to access spaces secured by the doors. In an alternative or additional example, the building control 508 may be configured to electronically tint windows to spaces which the entity 504 does not have sufficient permissions, based on roles, to view.

Note that similar types of environmental changes may be made even for entities having roles with more permissions than a visitor entity. For example, the environment may be changed with alerts and alarms if an entity that is an "employee" entity (without additional special permissions) attempts to access service elevators, maintenance rooms, etc. For example, if a general employee entity attempted to access a maintenance room, the building control 508 may direct the employee away from the room using visual clues.

Continuing now with the running example, the entity 504 can then change directions as a result of the prompting by the sign 512A to proceed towards the sensor 506C. The sensor 506C detects the approaching entity 504 and provides this information to the building control 508. The building control 508 can identify the identity of the entity 504, and cause environmental changes in the building 502 as appropriate. In the particular example illustrated, the building control 508 can cause the sign 512B to provide further direction to the entity 504 to direct the entity to the conference room 510. Again, as illustrated previously, the sensor 506C may be used in conjunction with the building control 508 to ensure that the entity 504 does not stray into portions of the building 502 for which the entity 504 does not have permission to enter. The entity 504 proceeds towards the sensor 506D which senses the entity 504 and provides information to the building control 508. This information can be used to identify the identity of the entity 504, roles associated with the entity 504, and environmental changes that should be made to the building 502 based on this information. In this example, the sign 512C is updated to indicate that the entity 504 should proceed towards the conference room 510. Knowing that the entity 504 has a meeting in the conference room 510, the building control 508 can cause the door 514 to be unlocked and/or opened for the entity 504 by actuating certain access control devices, such as automated locks and door openers. The entity 504 can then enter the conference room 510.

Note that based on the identity of the entity 504 the room 510 may have been prepared for the entity's arrival. For example, the room 510 includes a device, which is a lighting control 516. The building control 508 may have information about preferences of the entity 504. So long as those preferences are within adjustments allowed for the entity 504 based on the entity's role and permissions, the building control 508 will cause the lighting control 516 to adjust lighting in the room 510 to a level that is preferred by the entity 504. Similar functionality may be performed with respect to temperature controls 518. That is, the building control 508 may have information, such as information based on previous interactions with the entity 504, preferences submitted by the entity 504 to the building control 508, or preferences obtained in other ways, that identifies the preferences for temperatures for the entity 504. So long as the preferred temperatures are within constraints allowed for the entity 504 based on its identity and associated role, the temperature controls 518 can adjust heating and cooling devices in the room 510 to a level preferred by the entity 504. Similar functionality may be provided with respect to other elements of the room 510. For example, the building control 508 may have information regarding seating preferences for the entity 504. So long as those preferences are within constraints based on the identity of the entity 504 and associated roles, then the seating constraints can be met. Such constraints may be for example softness of a chair, height of the chair, recline angle of the chair, location of the chair in the room 510, etc. Note that using the principles illustrated herein, the building control 508 may control any of a number of different environmental conditions of the room 510. For example, the building control 508 can adjust desk heights, furniture configurations, presence of certain equipment (such as video, teleconference, whiteboarding, recording, computing, or other equipment), room coloring, or other environmental conditions.

Note that in some embodiments, the entity 504 may be able to request changes to the environment. For example, the room 510 includes a sensor 506E. The sensor 506E may include user inputs, such as tactile inputs, voice inputs, gesture inputs, etc. The entity 504 can request changes to the environment in the room 510 using the sensor 506E. For example, the entity 504 may use a voice command detected by the sensor 506E indicating that the entity 504 wishes for the temperature in the room 510 to be raised. The building control 508 knows the identity of the entity 504, can determine the role of the entity 504, and thus permissions of the entity 504. If the entity 504 has sufficient permissions to raise the temperature of the room, then the environment will be changed by raising the temperature of the room as indicated by the entity 504.

Various different alternative embodiments may be implemented. For example, in some embodiments, the entity 504 can request a specific environmental condition. For example, the entity 504 may request that a temperature be changed to a particular setting. In other embodiments, changes to the environment may be based on contextual clues of the entity. For example, the entity 504 may say "I'm hot" or "I'm cold". This may be sufficient to cause the building control 508 to change the temperature of the environment of the building 502. Alternatively or additionally, the sensor 506E may monitor the physical state of the entity to detect body temperature changes, sweating, the entity 504 putting on or taking off layers of clothing, etc. Dependent on the role of the entity, the building control may adjust temperatures based on these contextual clues.

Note that different entities may have different roles, and thus different permissions within the system. For example, in some embodiments, a visitor entity will not have the same permissions as a regular full-time employee entity. For example, a visitor may be able to have requests of temperature changes between 68 and 72° F. honored by the building control 508, but will not have any temperature requests outside of this range honored by the building control 508. This is due to the entity not having sufficient permissions based on role to request such changes. In contrast, a full-time employee entity can have requests for temperature changes between 65 and 75° F. honored as a result of having a role with sufficient permissions to request these changes. A building maintenance entity may be able to have requests outside of this range honored based on its role as a building maintenance entity.

The following illustrates various additional features and factors that may be included in some embodiments.

Some embodiments may be used for common day to day activities. For example, embodiments may be used for automatically, or with user input, booking conference rooms, wayfinding, allowing an entity to obtain information about a location space, finding meeting places with certain equipment (such as projectors, televisions, etc.), finding meeting places for certain activities (such as brainstorming, quite contemplations, etc.).

In some embodiments, a voice agent mobile app on a device carried by the entity 504 may be used to receive input from the entity. Alternatively, or additionally, a voice agent mobile app or a voice agent embedded within another mobile app (e.g., Cortana®, available from Microsoft® Corporation of Redmond, Wash., Siri® available from Apple Corporation of Cupertino, Calif., Alexa® available from Amazon Corporation of Seattle Wash., etc.) may be used to gather input from the entity 504. Alternatively or additionally, chat agents, text agents, gesture input agents, etc., may be used. Alternatively, the building 502 may include sensors and controls to allow the building to receive input from the entity 504.

The building control 508 may store individual preferences. This may allow the building control 508 to set temperatures when an entity enters a space. Alternatively or additionally, the building control could set desk height, chair position, etc. when the entity 504 checks into a desk.

As noted various sensors may be used to identify entities in a space. For example, beacons and associated detectors may be used. Meeting calendars with invite lists may be used. A user device, such as a smart phone, can identify and authenticate an entity to authenticate with a particular user experience.

Some embodiments may be able to track entities within a space using the sensors and other functionality illustrated herein. This could be used to identify entity locations for other entities.

Some embodiments implement localized control. For example, knowing the location of an entity making a request can change the nature of environmental changes. For, example, if an entity requests for lights to be turned on or off, the entity will not need to specify which lights when the entity intends for localized lights to be turned on or off. Rather, lights associated with the location in which the entity is presently occupying will be turned on or off by a simple command such as "turn on the lights" or "turn off the lights." This is in contrast to previous systems which did not control equipment based on user role, and further required the user to specify which particular equipment should be controlled. Rather, embodiments herein are able to take generalized input from a user, not identifying specific devices, and to control specific devices based on the location context of a user.

Some embodiments may allow a user to report maintenance or other building status issues. For example, if the entity 504 is in the room 510, the entity 504 may indicate problems with equipment in the room, or other room maintenance issues, such as spilled items, full trash cans, dirty floors, etc. This may be as simple as the entity 504 having conversations with other entities which are understood by the building control contextually, or as a result of the entity 504 specifically indicating to the building control, through the sensor 506E, the need for maintenance. The building control 508 can modify environmental conditions by causing the environment to have an alert status associated with it. Maintenance can then be notified by the building control 508 to address the alert.

Embodiments may include anticipatory behavior. For example, the building control 508 is able to identify that an entity 504 is working in a workspace (using sensors such as cameras, beacon readers, etc.), but has an upcoming meeting on a different floor (using calendar information). The building control may determine that the entity gets up around the time of the meeting (using camera sensors, pressure sensors in a chair, etc.). As a result, the building control can cause an elevator to be called at a time that will cause the elevator to arrive at the same floor that the entity is occupying about the time that the entity will reach the elevator. This could be based on previous observations about the entity, such as walking speed, habits (such as using a restroom prior to a meeting), knowing that entities that typically converse with the entity (and knowing a typical length of conversations) are present in the entity's path to the elevator (i.e., the entity is likely to be delayed to the elevator due to a likely conversation with another entity), etc. Of course, the building control is able to correlate this with other elevator uses.

Some embodiment may include functionality for scheduling auxiliary spaces. For example, the building control 508 may know that the entity 504 is early for the meeting, and that the entity topically likes to occupy a particular working room when waiting for meetings. The building control 508 may schedule the working room, and direct the entity 504 to the working room prior to the meeting in the room 510. When it is time for the entity 504 to go to the meeting in the room 510 (based on typical walking speed known about the entity and/or other factors), an alarm or other prompting could be provided by the building control 508, through equipment at the building 502 or apps controlled by the user for interacting with the building 502 to direct the entity 504 to the meeting.

In general, the building control can keep track of different users and what they have access to, as well as what devices and capabilities a space has.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
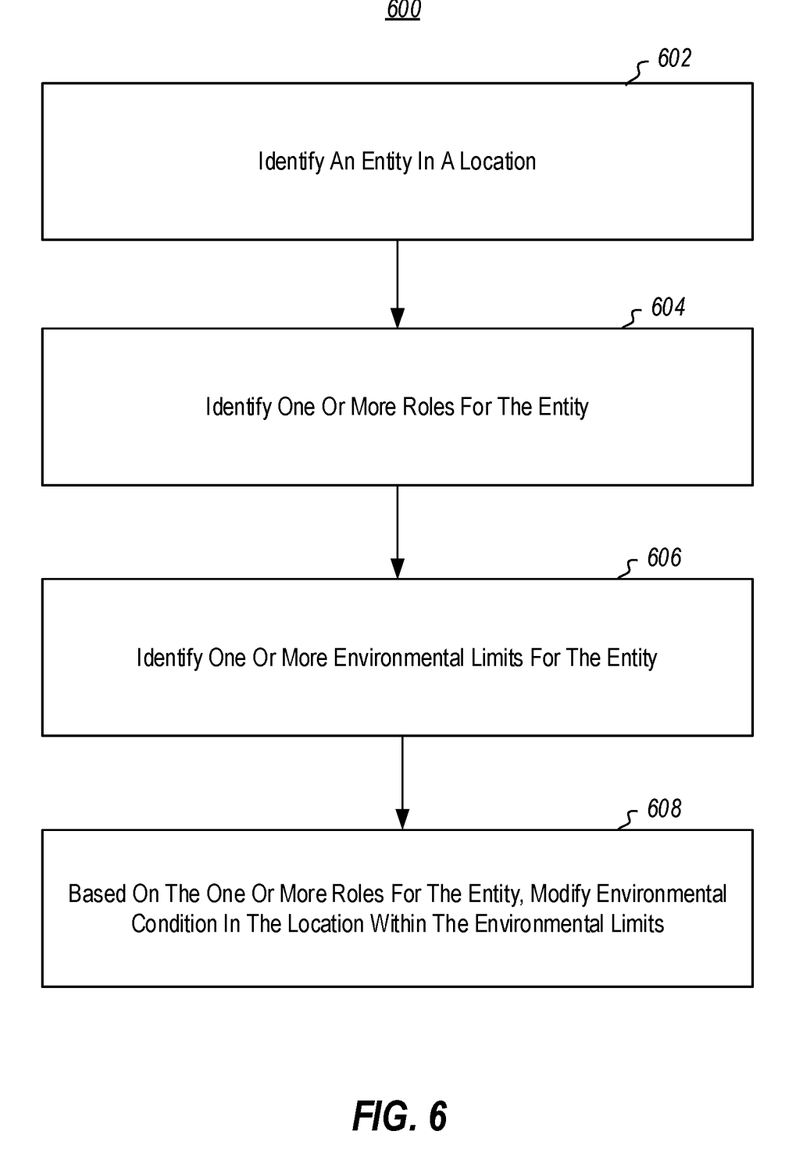
FIG. 6 illustrates a flowchart of a method for controlling environmental conditions in a location based on entity roles.

Referring now to FIG. 6, a method 600 is illustrated. The method 600 includes acts for controlling environmental conditions. The method 600 includes using one or more sensors in a location, identifying an entity in the location (act 602).

The method 600 further includes identifying one or more roles for the entity (act 604). The roles may be associated with permissions.

The method 600 further includes identifying one or more environmental limits for the entity.

The method 600 further includes, based on the one or more roles for the entity, modifying environmental conditions in the location within the environmental limits, by modifying one or more devices associated with the location (act 608). Thus, embodiments may modify the temperature and lighting conditions within allowable limits correlated to the particular entity, modify environmental accessibility within allowable limits correlated to the entity.

The method 600 may be practiced where modifying environmental conditions is performed automatically without additional input from the entity.

The method may further include receiving input at one or more sensors from the entity requesting a particular change to the environmental conditions; determining that the entity has permissions, based on the one or more roles, to cause the particular change to occur; and wherein modifying the environmental condition is performed as a result. Thus, for example, the entity can provide additional input requesting environmental changes. This request may be explicit, or implicit based on contextual actions by the entity.

The method 600 may be practiced where the entity is identified as an unknown entity, such that a specific set of roles for unknown entities are identified.

The method 600 may be practiced where modifying environmental conditions in the location comprises changing at least one of temperature or lighting for the location.

The method 600 may be practiced where modifying environmental conditions in the location is performed based on previously known data about the entity. For example, previous interactions by the entity with devices in the location, or set preferences of the entity may be used to modify environmental conditions.

The method 600 may be practiced where modifying environmental conditions comprises providing directions to the entity using changeable signs in the location.

The method 600 may be practiced where modifying environmental conditions comprises automatically adjusting furniture for the entity.

The method 600 may be practiced where identifying the entity comprises identifying the entity using biometric input data from the one or more sensors.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable media having stored thereon instructions that are executable by the one or more processors to configure the computer system to control environmental conditions, including instructions that are executable to configure the computer system to perform at least the following:
   using one or more sensors in a location, identify an entity in the location;
   identify one or more roles for the entity;
   access a graph that defines a topology of areas in the location;
   identify one or more predefined geographical limits for the entity within the location based on the graph and the identified one or more roles for the entity; and
   modify at least one environmental condition to guide the entity along a route within the predefined geographical limits for the entity by modifying one or more devices associated with the location.

2. The computer system of claim 1, wherein modifying environmental conditions is performed automatically without additional input from the entity.

3. The computer system of claim 1, wherein the entity is identified as an unknown entity, such that a specific set of roles for unknown entities are identified.

4. The computer system of claim 1, wherein modifying environmental conditions in the location comprises changing at least one of temperature or lighting for the location.

5. The computer system of claim 1, wherein modifying environmental conditions in the location is performed based on previously known data about the entity.

6. The computer system of claim 1, wherein modifying environmental conditions comprises providing directions to the entity using changeable signs in the location.

7. The computer system of claim 1, wherein modifying environmental conditions comprises automatically adjusting furniture for the entity.

8. The computer system of claim 1, wherein identifying the entity comprises identifying the entity using biometric input data from the one or more sensors.

9. The computer system of claim 1, wherein the computer readable media further comprise computer executable instructions that when executed by the one or more processors configure the computer system to perform the following:
receive input at one or more sensors from the entity requesting a particular change to the environmental conditions;
determine that the entity has permissions, based on the one or more roles, to cause the particular change to occur; and
wherein modifying the environmental condition is performed as a result.

10. A method of controlling environmental conditions, the method comprising:
using one or more sensors in a location, identifying an entity in the location;
identifying one or more roles for the entity
accessing a graph that defines a topology of areas in the location;
identifying one or more predefined geographical limits for the entity within the location based on the graph and the identified one or more roles for the entity; and
modifying at least one environmental condition to guide the entity along a route within the predefined geographical limits by modifying one or more devices associated with the location.

11. The method of claim 10, wherein modifying environmental conditions is performed automatically without additional input from the entity.

12. The method of claim 10, further comprising:
receiving input at one or more sensors from the entity requesting a particular change to the environmental conditions;
determining that the entity has permissions, based on the one or more roles, to cause the particular change to occur; and
wherein modifying the environmental condition is performed as a result.

13. The method of claim 10, wherein the entity is identified as an unknown entity, such that a specific set of roles for unknown entities are identified.

14. The method of claim 10, wherein modifying environmental conditions in the location comprises changing at least one of temperature or lighting for the location.

15. The method of claim 10, wherein modifying environmental conditions in the location is performed based on previously known data about the entity.

16. The method of claim 10, wherein modifying environmental conditions comprises providing directions to the entity using changeable signs in the location.

17. The method of claim 10, wherein modifying environmental conditions comprises automatically adjusting furniture for the entity.

18. The method of claim 10, wherein identifying the entity comprises identifying the entity using biometric input data from the one or more sensors.

19. A computer system comprising:
one or more processors; and
one or more computer-readable media having stored thereon instructions that are executable by the one or more processors to configure the computer system to implement a building control, wherein the building control is configured to:
receive data from sensors in locations in a building;
using the data from the sensors, identify entities in the locations;
identify one or more roles for the entities;
access a graph that defines a topology of areas in the location;
identify one or more predefined geographical limits for the entity within the location based on the graph and the identified one or more roles for the entity; and
modify at least one environmental condition to guide the entity along a route within the predefined geographical limits by controlling devices associated with the building.

20. The computer system of claim 19, wherein the building control is further configured to receive user input from the entities, and wherein modifying environmental control is based on permissions for the entities and the user input from the entities.

21. The computer system of claim 1, wherein the predefined geographical
limits define at least one route that the entity is authorized to follow.

* * * * *